United States Patent
Chinnakkonda Vidyapoornachary et al.

(10) Patent No.: US 9,606,741 B2
(45) Date of Patent: Mar. 28, 2017

(54) MEMORY POWER MANAGEMENT AND DATA CONSOLIDATION

(71) Applicant: International Business Machines Corporation, Armonk, NY (US)

(72) Inventors: Diyanesh B. Chinnakkonda Vidyapoornachary, Bangalore (IN); Edgar R. Cordero, Round Rock, TX (US); Anand Haridass, Bangalore (IN); Arun Joseph, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 362 days.

(21) Appl. No.: 14/279,706

(22) Filed: May 16, 2014

(65) Prior Publication Data

US 2015/0277543 A1    Oct. 1, 2015

Related U.S. Application Data

(63) Continuation of application No. 14/228,351, filed on Mar. 28, 2014.

(51) Int. Cl.
*G06F 1/32* (2006.01)
*G06F 3/06* (2006.01)
(Continued)

(52) U.S. Cl.
CPC .......... *G06F 3/0625* (2013.01); *G06F 1/3275* (2013.01); *G06F 1/3293* (2013.01);
(Continued)

(58) Field of Classification Search
CPC .... G06F 3/0625; G06F 3/0673; G06F 3/0656; G06F 3/0658; G06F 3/0647; G06F 12/0893; G06F 2212/151; G06F 2212/1028
See application file for complete search history.

(56) References Cited

U.S. PATENT DOCUMENTS 6,330,627 B1    12/2001    Toda
6,745,271 B2    6/2004    Toda
(Continued)

FOREIGN PATENT DOCUMENTS

WO    2009032751 A2    3/2009
WO    2009046190 A1    4/2009
WO    2010011534 A1    1/2010

OTHER PUBLICATIONS

Accelerated Examination Support Document, U.S. Appl. No. 15/138,694, signed Apr. 13, 2016, 15 pgs.
(Continued)

*Primary Examiner* — Zahid Choudhury
(74) *Attorney, Agent, or Firm* — Leonard T. Guzman

(57) ABSTRACT

According to embodiments of the disclosure, methods, systems and computer program products for memory power management and data consolidation are disclosed. The method may include selecting a first real memory portion and a second real memory portion from a plurality of real memory portions coupled to a memory controller in a computer system by a memory bus. The first real memory portion may be connected to a first buffer and the second real memory portion may be connected to a second buffer. The first and second real memory portions may be selected by the memory controller. The method may include migrating data from the first real memory portion to the second real memory portion on a migration bus through the first and second buffers. The method may also include placing the first real memory portion into a reduced power mode.

9 Claims, 6 Drawing Sheets

(51) Int. Cl.
*G06F 13/28* (2006.01)
*G06F 13/42* (2006.01)
*G06F 12/08* (2016.01)

(52) U.S. Cl.
CPC .......... *G06F 3/0647* (2013.01); *G06F 3/0656* (2013.01); *G06F 3/0658* (2013.01); *G06F 3/0673* (2013.01); *G06F 12/0893* (2013.01); *G06F 13/28* (2013.01); *G06F 13/4247* (2013.01); *G06F 2212/1028* (2013.01); *G06F 2212/151* (2013.01); *Y02B 60/1228* (2013.01); *Y02B 60/1235* (2013.01)

(56) References Cited

U.S. PATENT DOCUMENTS

| | | |
|---|---|---|
| 7,272,734 B2 | 9/2007 | Gooding |
| 7,788,513 B2 | 8/2010 | Vaden et al. |
| 8,103,881 B2 | 1/2012 | Doughty et al. |
| 8,108,629 B2 | 1/2012 | Shimizu et al. |
| 8,392,736 B2 | 3/2013 | Vaden |
| 8,572,271 B2 | 10/2013 | Raveendran |
| 2005/0268061 A1 | 12/2005 | Vogt |
| 2008/0005516 A1 | 1/2008 | Meinschein et al. |
| 2009/0031150 A1 | 1/2009 | Koga |
| 2009/0063786 A1* | 3/2009 | Oh ...................... G06F 11/1068 711/148 |
| 2013/0124887 A1 | 5/2013 | Lee |
| 2013/0268741 A1 | 10/2013 | Daly et al. |
| 2015/0277542 A1 | 10/2015 | Chinnakkonda Vidyapoornachary et al. |

OTHER PUBLICATIONS

Chinnakkonda Vidyapoornachary et al., "Memory Power Management and Data Consolidation," U.S. Appl. No. 15/138,694, filed Apr. 26, 2016.

Fan et al., "Memory Controller Policies for DRAM Power Management", ISLPED '01: Proceedings of the 2001 International Symposium on Low Power Electronics and Design, Aug. 2001, pp. 129-134, Copyright 2001 ACM, New York, NY, USA. DOI: 10.1145/383082.383118.

Unknown, "Live Partition Mobility", Wikipedia, (Accessed Sep. 6, 2013, Printed Dec. 17, 2013, Last Updated Mar. 10, 2013). http://en.wikipedia.org/wiki/Live_Partition_Mobility.

Chinnakkonda Vidyapoornachary et al., "Memory Power Management and Data Consolidation", U.S. Appl. No. 14/228,351, filed Mar. 28, 2014.

* cited by examiner

MEMORY POWER MANAGEMENT AND DATA CONSOLIDATION

BACKGROUND

The present disclosure relates to memory management, more particular aspects relate to memory data management and data consolidation. As memory technology has advanced, resources requirements, such as power consumption, to computer systems have increased. Memory may have data dispersed across several memory modules which may result in power consumption inefficiencies. Thus, it may be advantageous to effectively manage data in order to increase power consumption efficiency and reduce computer resource requirements.

SUMMARY

According to embodiments of the present disclosure, a method of memory power management may include selecting a first real memory portion and a second real memory portion from a plurality of real memory portions coupled to a memory controller in a computer system by a memory bus. The plurality of real memory portions each may have a dedicated buffer, the first real memory portion may be connected to a first buffer and the second real memory portion may be connected to a second buffer. The first and second real memory portions may be selected by the memory controller. The method may include migrating data from the first real memory portion to the second real memory portion on a migration bus through the first and second buffers. The migration bus may connect each of the dedicated buffers. The method may also include placing the first real memory portion into a reduced power mode. The data may be migrated and the first real memory portion may be placed into the reduced power mode by a data management controller included within at least one of the dedicated buffers. The migration bus may connect each of the dedicated buffers in a daisy chain.

The method may further include updating, in a hardware controller, a physical address of the data from the first real memory portion to the second real memory portion. The hardware controller may include a hypervisor. The method may further include selecting a third real memory portion from the plurality of real memory portions coupled to a memory controller in a computer system. The third real memory portion may be connected to a third buffer and the second real memory portion connected to a second buffer, the first, second, and third real memory portions may be selected by the memory controller. The method may include migrating data from the first real memory portion to at least the second and third real memory portions on the migration bus through the first, second and third buffers.

The memory controller may select the first and second real memory portions in response to a migration trigger. The migration trigger may include determining that the first real memory stores data having a data size less than an available capacity of the second real memory portion. The migration trigger may include determining that a quantity value for the data in the first real memory portion is below a transfer threshold. The migration trigger may include determining that the second real memory portion has an available capacity to receive the data from the first real memory portion. The migration trigger may include determining that a first power consumption value for the first real memory is greater than a second power consumption value for the second real memory portion.

A system for memory power management may include a plurality of real memory portions including a first real memory portion and a second real memory portion, each of the plurality of real memory portions having a dedicated buffer including a first buffer connected to the first real memory portion and a second buffer connected to the second real memory portion. The system may include a migration bus, the migration bus connecting each of the dedicated buffers. The system may also include a data management controller, within at least one of the dedicated buffers. The data management controller may be configured to migrate data, from the first real memory portion to the second real memory portion across the migration bus through the first and second buffers. The data management controller may also be configured to place the first real memory portion into a reduced power mode.

The system may also include a memory controller, the plurality of real memory portions coupled to the memory controller by a memory bus. The memory controller may be configured to select the first and second real memory portions. The data management controller may be configured to migrate data from the selected first real memory portion to the selected second real memory portion. The migration bus may connect each of the dedicated buffers in a daisy chain. The plurality of real memory portions may include a third real memory portion connected to a third buffer. The data management controller may be configured to migrate data, from the first real memory portion to at least the second and third real memory portions across the migration bus through the first, second, and third buffers.

The system may further include a hardware controller. The hardware controller may include a physical address of the data, the data management controller further configured to update the physical address of the data from the first real memory portion to the second real memory portion. The hardware controller may include a hypervisor. The memory controller may be further configured to select the first and second real memory portions in response to a migration trigger. The migration trigger may include determining that the first real memory stores data having a data size less than an available capacity of the second real memory portion. The migration trigger may include determining that the data in the first real memory portion is below a transfer threshold. The migration trigger may include determining that the second real memory portion has an available capacity to receive the data from the first real memory portion. The migration trigger may include determining that a first power consumption value for the first real memory is greater than a second power consumption value for the second real memory portion.

A computer program product for memory power management, the computer program product comprising a computer readable storage medium having program instructions embodied therewith, the program instructions executable by a computer to cause the computer to perform a method may include selecting a first real memory portion and a second real memory portion from a plurality of real memory portions coupled to a memory controller in a computer system by a memory bus. The plurality of real memory portions may each having a dedicated buffer, the first real memory portion may be connected to a first buffer and the second real memory portion may be connected to a second buffer, the first and second real memory portions selected by the memory controller. The computer program product may include migrating data from the first real memory portion to the second real memory portion on a migration bus through the first and second buffers, the migration bus connecting each of the dedicated buffers. The computer program product may include placing the first real memory portion into a reduced power mode. The data may be migrated and the first real memory portion may be placed into the reduced power mode by a data management controller included within at least one of the dedicated buffers.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
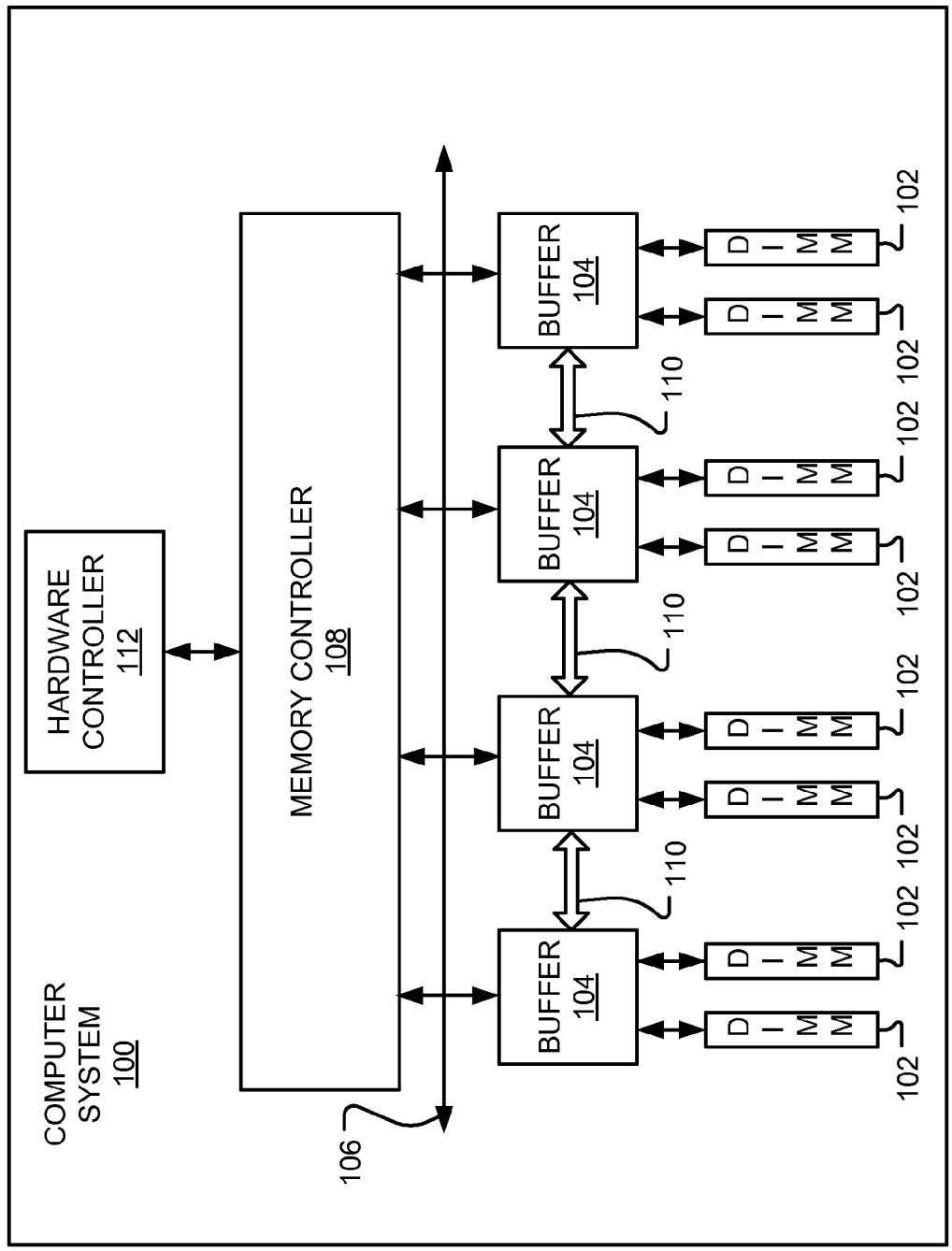
FIG. 1 depicts a computer system for memory power management according to an embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to memory management, more particular aspects relate to memory data management and data consolidation. While the present disclosure is not necessarily limited to such applications, various aspects of the disclosure may be appreciated through a discussion of various examples using this context.

While the same nomenclature and same numbers may be used to identify elements throughout the disclosure, this practice is not intended to limit the scope of the disclosure. Identified elements in one figure may not be identical to other same named or identified elements in other figures.

As memory capacity has increased and advancements have occurred in memory technology, memory power requirements have increased. A computer system including a plurality of volatile real memory portions may have a range of power consumption which depends upon the number of active real memory portions within the system. Generally, power supplies supplying power to memory are configured to supply a quantity of power which accounts for the upper limit of the range of memory power consumption. This allows the computer system to provide for broader operating conditions. However, this may lead to less efficient utilization of energy. Data may be allocated spread out among multiple memory portions. Rather than spreading the data out, in some instances that data may be consolidated within fewer portions and portions containing no data may have power reduced.

Memory power consumption in a computing system may be reduced by various methods. One method may include transferring data, from a real memory portion within a plurality of real memory portions to one or more other real memory portions within the plurality of real memory portions so that the total number of real memory portions containing data is decreased. Memory portions may include any portion of volatile real memory. For example a real memory portion, may be a single rank of memory. In an embodiment, the single rank of memory may have a capacity of 2 gigabytes (GB). However, the size of the real memory portion is not limited, and may include one or more ranks, modules, or other units of memory. This process of transferring data to decrease total real memory portions having data may be referred to herein as memory consolidation.

Real memory portions containing no pages of data (empty real memory portions) may be placed in a reduced power mode, thereby reducing power consumption by the computer system. Reduced power mode may be implemented in various types of volatile real memory, such as a DRAM. When volatile real memory is placed in reduced power mode, power consumption may be decreased by turning off real memory portions. In an embodiment, reduced power mode may control volatile real memory power consumption at rank level. For example, if all pages in a rank are not used, that rank may be turned off. Volatile real memory may include multiple ranks of memory. Each rank may have a capacity which may allow the rank to store one or more pages. Each page may hold one or more logical memory blocks.

In some embodiments, reduced power mode reduces power consumption to zero and the data stored in volatile real memory may be lost. The term reduced power mode is used herein to denote any mode in any memory (e.g., DRAM, SRAM, or other volatile memory devices) that may cause a reduction of power and may cause loss of data. DRAM memory is used for illustrative purposes, but the disclosure is not limited to DRAM memory. The computing system then may continue to operate with the empty real memory portions in reduced power mode.

Memory consolidation however may affect mainline memory operation and slow system performance during the memory consolidation process. An approach therefore may be advantageous which increases the efficiency of memory consolidation in the interest of providing improved energy conservation.

A system for memory power management may include a plurality of real memory portions coupled to a memory controller by a memory bus. The plurality of real memory portions may include a first real memory portion and a second real memory portion. Each of the plurality of real memory portions may have a dedicated buffer including a first buffer connected to the first real memory portion and a second buffer connected to the second real memory portion. The memory controller may be configured to select the first and second real memory portions. The system may also include a migration bus, the migration bus connecting each of the dedicated buffers, and a data management controller, within at least one of the dedicated buffers. The data management controller may be configured to migrate data, from the first real memory portion to the second real memory portion across the migration bus through the first and second buffers, and place the first real memory portion into a reduced power mode.

Referring now to FIG. 1, a computer system 100 according to an embodiment may be seen. The computer system may include a plurality of real memory portions 102. The plurality of real memory portions 102 may each have a dedicated buffer 104. The plurality real memory portions 102 may be connected, via a memory bus 106, to a memory controller 108. The dedicated buffers 104 may be connected together by a migration bus 110. A hardware controller 112 may be connected to the memory controller 108.

The plurality of real memory portions may provide the computer system 100 with volatile real memory. The plurality of real memory portions 102 may be constructed as cards containing one or more memory chips (e.g., DRAM chips), or DIMMs (dual inline memory modules), or other suitable unit of memory. In an embodiment, the plurality of real memory portions may be a plurality of memory ranks. In FIG. 1, an embodiment may be seen where the plurality of real memory portions 102 are constructed as DIMMs, however other types of suitable memory may be used in lieu of DIMMs. Various amounts of memory in the memory portions may be used. In an embodiment, a computer system 100 might have a plurality of real memory portions 102 made up of eight 2 GB DIMMs.

The plurality of real memory portions 102 may provide a physical location for data, or pages, to be stored in the computer system 100. A page (memory page or virtual page) may be a contiguous block of virtual memory that is used in memory allocation performed by the memory controller for an application or program. The plurality of real memory portions 102 may contain various kinds of data such as an operating system, memory data, a power control program, or other data. Memory data may be information regarding the plurality of real memory portions 102. For example, memory data, in various embodiments, may contain capacity information of each real memory portion, power consumption information of each real memory portion, and a value for a transfer threshold. Memory data may be used by the memory controller to select first and second real memory portions for memory consolidation, described further below.

Dedicated buffers 104 may be connected to each of the plurality of memory portions 102. The dedicated buffers 104 may provide various functions including providing a region of a physical storage used to temporarily store data while it is transmitted to and from the plurality of memory portions 102, verifying channel connectivity, synchronizing memory modules, detecting errors, providing logic for the plurality of real memory portions, and other functions. The dedicated buffers 104 may be implemented in a fixed memory location in hardware. In an embodiment, the dedicated buffers 104 may be a DIMM controller chip on a DIMM module with one or more of the plurality of real memory portions 102. At least one data management controller, described further below, may be included within the dedicated buffers 104. The data management controller may contain logic to control memory transfer between the plurality of memory portions 102 across the migration bus 110.

The memory controller 108 may perform various functions within the computer system 100. For example, the memory controller 108 may perform fetch and store operations. The memory controller 108 may be coupled to the plurality of real memory portions 102 by a memory bus 106. The memory controller 108 may contain and execute logic or instructions. In an embodiment, the memory controller 108 may be configured to select a first real memory portion and a second real memory portion from the plurality of real memory portions 102 for memory consolidation. The memory controller 108 may select the first and second real memory portions based on a migration trigger. In an embodiment, A third real memory portion or more portions from the plurality of real memory portions 102 may also be selected by the memory controller 108 for consolidation of data.

The migration trigger may be one or more conditions which may be detected by the memory controller 108. The one or more conditions may involve status of the plurality of real memory portions 102 such as available capacity of the real memory portions, power consumption data, or other information. The migration trigger may be one or more conditions which identify when a real memory portion is preferred for memory consolidation. In an embodiment, the memory controller 108 may select a first and second real memory portion in response to detecting the migration trigger in both the first and second real memory portions. The memory controller 108 may detect the migration trigger based on real time conditions.

The migration bus 110 may allow for data, or pages, to be transferred between the plurality of memory portions 102 through the dedicated buffers 104. The migration bus 110, may connect each of the dedicated buffers 104. The migration bus is distinct from the memory bus 106, and may allow for a dedicated path for data transfer when consolidating memory between the plurality of memory portions 102. The migration bus may allow for normal levels of traffic on the memory bus 106, which may reduce memory latency and improve computer system 100 performance while performing memory consolidation. The migration bus 110 may be constructed as various types of buses, including parallel bus, serial bus, or other type of bus. The migration bus may allow for peer to peer transfer of data, master/slave transfer of data, or other type of connection. In an embodiment, the migration bus is configured as a daisy chain connecting each of the dedicated buffers 104.

The hardware controller 112 may perform various functions within the computer system 100. This may include keeping track of where pages of memory are stored in real memory. The hardware controller may be implemented in various forms including as a hypervisor which may operate a virtual machine which performs control functions regarding the plurality of memory portions, as a BIOS (Basic Input/Output System), or other suitable hardware controller. The hardware controller may also be implemented as hardware, software, or a combination of the two. In an embodiment the hypervisor may be a firmware component which manages overall system resources. In an embodiment the hypervisor may manage requests for memory allocation and de-allocation from operating system(s) running on one or more logical partitions.

FIG. 1 depicts a representative of certain major components of the computer system 100. Individual components, however, may have additional detail not represented in FIG. 1 for ease of understanding and not necessary to understand the embodiment shown. Components other than or in addition to those shown in FIG. 1 may be present, and the number, type, and configuration of such components may vary. Several particular examples of additional detail or additional variations are disclosed herein. These examples are by way of example only and are not necessarily the only such variations. The various program components illustrated in FIG. 1 may be implemented, in various embodiments, in a number of different manners, including using various computer applications, routines, components, programs, objects, modules, data structures, etc., which may be referred to herein as software, computer programs, or simply programs.

Figure 2:
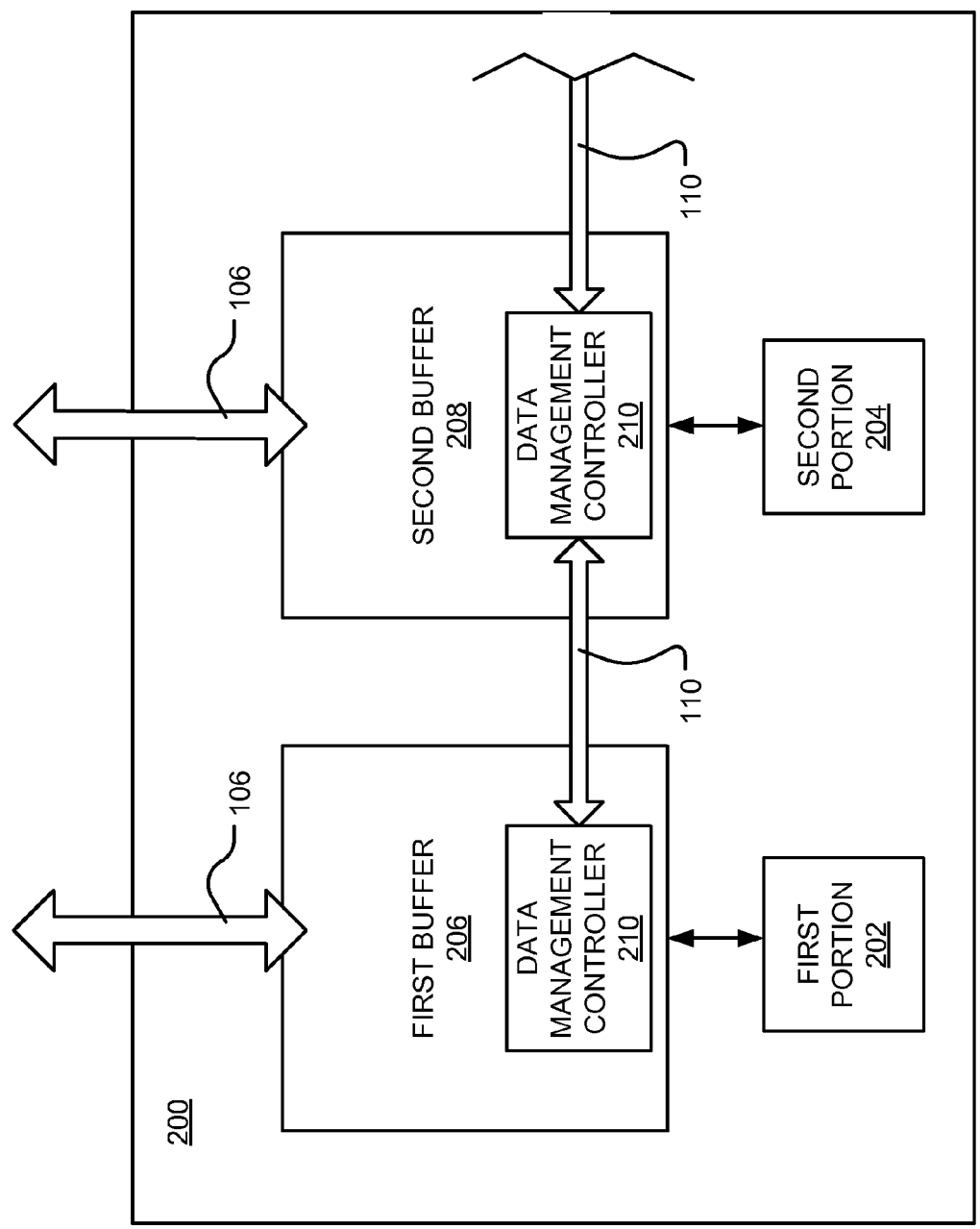
FIG. 2 depicts a memory subsystem for memory power management according to an embodiment.

FIG. 2 shows a view of a memory subsystem 200 according to an embodiment. The memory subsystem 200 may be a detailed view of a larger computer system with elements of the computer system omitted for clarity which are not required to explain the embodiment shown. The memory subsystem 200 may have real memory portions including a first real memory portion 202 and a second real memory portion 204. The subsystem 200 may include dedicated buffers including a first buffer 206 connected to the first real memory portion 202, and a second buffer 208 connected to the second real memory portion 204. The first buffer 206 and the second buffer 208 may each have a data management controller 210 included within. A migration bus 110 may connect the first and second buffers. In an embodiment, the memory subsystem 200 may be may be constructed as cards containing one or more memory chips (e.g., DRAM chips), or DIMMs (dual inline memory modules), or other suitable unit of memory which contains the elements of the memory subsystem 200.

The first real memory portion 202 and the second real memory portion 204 may be the same or substantially similar as the plurality of real memory portions described above. The first and second real memory portions, 202, 204 may be connected to a memory bus 106. The first and second real memory portions 202, 204, may provide volatile real memory to a computer system. The first and second real memory portions 202, 204 may be constructed as cards containing one or more memory chips (e.g., DRAM chips), or DIMMs (dual inline memory modules), or other suitable unit of memory. In an embodiment, the first and second real memory portion 202, 204, may each be a rank of memory. The first and second portions may have varying amounts of memory. In an embodiment, the first real memory portion 202 and the second real memory portion 204 each have a capacity of 2 GB.

The first buffer 206 and the second buffer 208 may be the same or substantially similar as the dedicated buffers described above. The first and second buffers 206, 208 may be connected to the first portion 202 and the second portion 204. The first and second buffers 206, 208 may provide various functions including providing a region of a physical storage used to temporarily store data while it is transmitted to and from the first and second portions 202, 204, verifying channel connectivity, synchronizing memory modules, detecting errors, providing logic for the first and second portions 202, 204, and other functions. The first and second buffers 206, 208, may be implemented in a fixed memory location in hardware. In an embodiment, the first and second buffers 206, 208, may be a DIMM controller chip on a DIMM module with at least one of the first and second portions 206, 208. At least one data management controller 210, described further below, may be included within the first and second buffers 206, 208. The data management controller 210 may contain logic to control memory transfer between the first and second portions 202, 204 across the migration bus 110.

The migration bus 110, may connect the first and second buffers 206, 208. The migration bus may allow for data, or pages, to be transferred between the first and second real memory portions 202, 204 through the first and second buffers 206, 208, and for memory to be consolidated within the memory subsystem 200. The migration bus is distinct from the memory bus 106, and may allow for a dedicated path for data transfer when consolidating memory between the first and second real memory portions 202, 204. The migration bus 110 may reduce traffic on the memory bus 106, which may reduce latency and improve performance while performing memory consolidation. The migration bus 110 may be constructed as various types of buses, including parallel bus, serial bus, or other type of bus. The migration bus 110 may allow for peer to peer transfer of data, master/slave transfer of data, or other type of connection. In an embodiment, the migration bus 110 is configured as a daisy chain connecting each of the dedicated buffers 104.

The data management controller 210 may contain logic to control memory transfer between the first and second real memory portions 202, 204, across the migration bus 110. The data management controller may be positioned within at least one of the first and second buffers 206, 208. The data management controller 210 may be configured to migrate data between real memory portions. For example, the data management controller 210 may migrate data from the first real memory portion 202 to the second real memory portion 204 across the migration bus 110 through the first and second buffers 206, 208. After the data is migrated, the data management controller 210 may place the first real memory portion into a reduced power mode. The reduced power mode may clear the first memory and memory consolidation may be complete between the first and second real memory portions.

The data management controller 210 may be configured to control the migration process and may include logic which controls the method of migration. In an embodiment, the data is migrated from the first real memory portion 202 to the second real memory portion 204 by writing the data to the second real memory portion, and clearing the first real memory portion, in response to determining that the data was written to the second real memory portion, by placing the first real memory portion in reduced power mode.

FIG. 3 shows an illustrative mapping of pages in a virtual memory 302 to pages in a real memory 304. Programmers may typically deal with virtual memory, and may not require details of where data is physically stored in real memory. For example, a user's view of memory might be as addressed by a 32 bit virtual address, and therefore, the user sees 4 GB (gigabytes) of continuous addressing space in memory, wherein the user can address any byte in that address space. The user may typically have no idea of where a particular byte is physically stored in the computing system. However, a hardware controller, such as a hypervisor or other suitable controller, may partition the virtual address space into pages. Virtual memory 302 is shown to have "N" pages (i.e., page-0 through page-N-1). Real memory 304 is shown to have real memory portions 304A, 304B, 304C, 304D, and 304E. Each real memory portion is shown having a capacity of 128 MB (megabytes), however real memory portions are not limited to any particular size and 128 MB is used as an example only.

When an application requires storage, the hardware controller 112 (FIG. 1) may allocate one or more pages of virtual memory (memory in a virtual page accessed by a "virtual address") to the application and determine where in real memory 304 the page or pages are to be stored (allocated). The physical location of the pages may then be accessed by a "physical address". The hardware controller may keep a cross-reference between each page in virtual memory 302 that has been allocated and the location in real memory 304 where the page is kept. In other words, when data is to be accessed, the hardware controller may map the virtual address to a physical address to store/fetch the data.

Figure 3A:
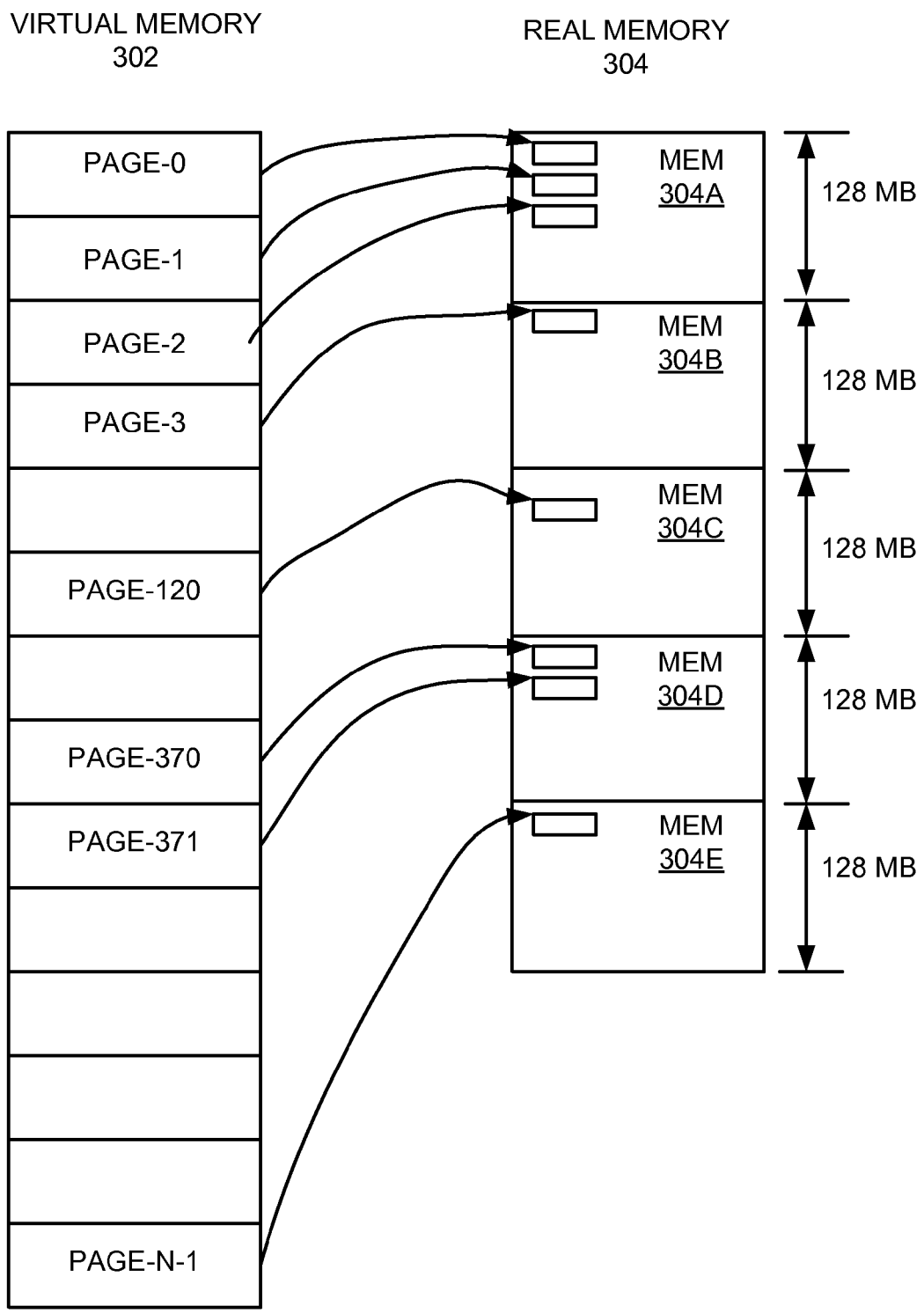
FIG. 3A depicts a virtual memory having pages. The pages are mapped to locations in real memory.

In the example of FIG. 3A, page-0, page-1, and page-2 in virtual memory are stored in real memory portion 304A. Real memory portion 304A, as explained further below, in various implementations can be a DIMM, a memory card, or other physical piece of memory designated by the designer as a real memory portion. Page-3 is stored in real memory portion 304B. Page-120 is stored in real memory portion 304C. Page-370 and page-371 are stored in real memory portion 304D. Page-N-1 is stored in real memory portion 304E. Arrows between virtual memory 302 and real memory 304 indicate the cross-reference maintained by the hardware controller.

Note that, for most users, the physical location in real memory 320 may not be of concern, and such users may rely on the memory controller to handle the details of mapping addresses of virtual memory 302 to physical addresses to access data in real memory 304. For these users, the hardware controller 112 (FIG. 1) may be free to move pages in real memory 304 from a first physical location to a second physical location, including to different real memory portions.

FIG. 3A illustrates how real memory portions may become sparsely populated, that is, have fewer pages allocated to them than they are capable of storing. In an embodiment, the pages in virtual memory may each represent a segment of data of having a size of 4 KB (kilobytes). In FIG. 1 the portions of real memory 304 may each have a capacity of 128 MB. In FIG. 3A, page-0, page-1, and page-2 in virtual memory are stored in real memory portion 304A. Real memory portion 304A, as explained further below, in various implementations can be a DIMM, a memory card, or other physical piece of memory designated by the designer as a real memory portion. Page-3 is stored in real memory portion 304B. Page-120 is stored in real memory portion 304C. Page-370 and page-371 are stored in real memory portion 304D. Page-N-1 is stored in real memory portion 304E. Thus, the real memory portions 304 may be sparsely populated and the fewer real memory portions may be used if the pages are consolidated in real memory 304.

Figure 3B:
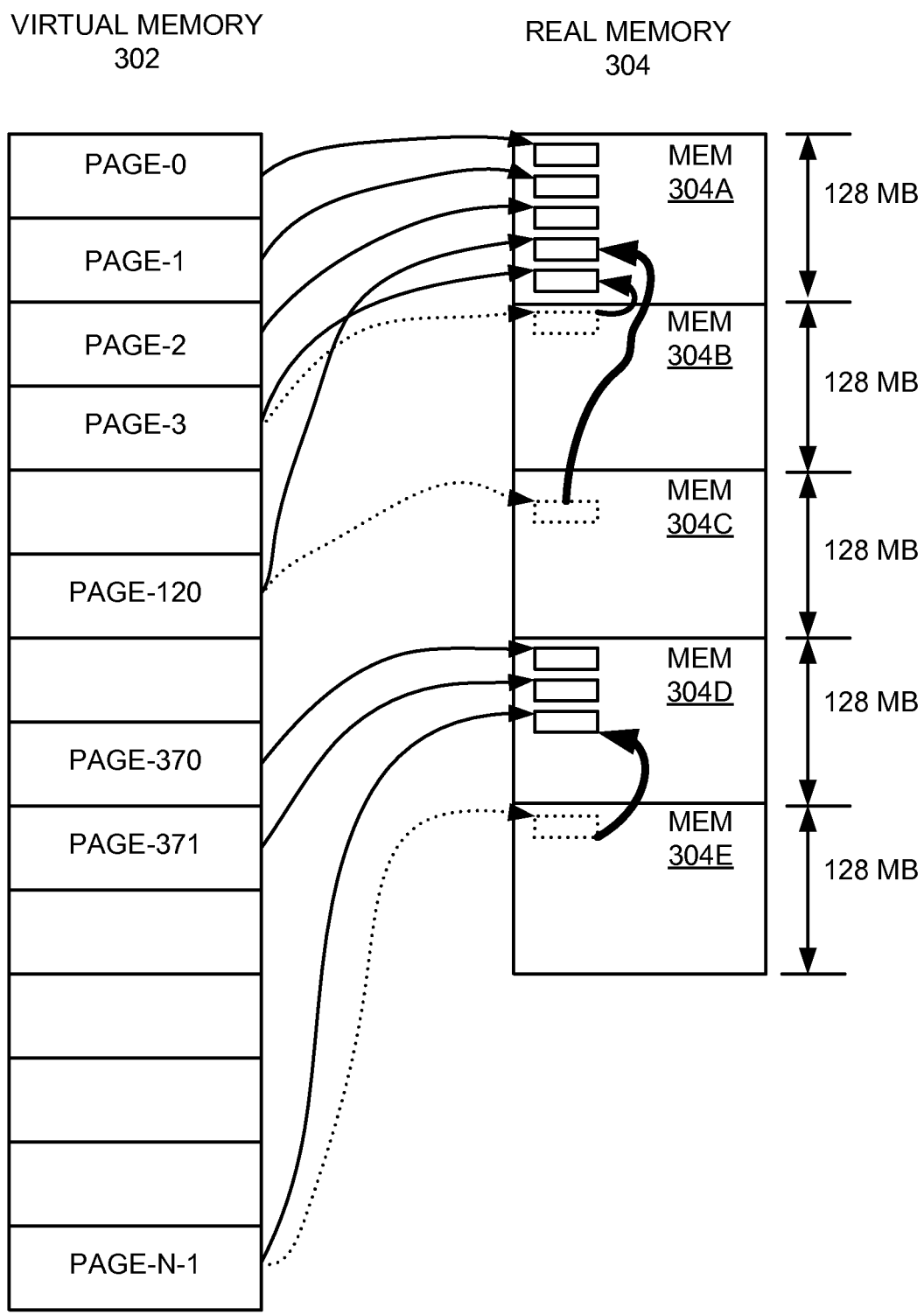
FIG. 3B depicts movement of pages from some real memory portions to other real memory portions.

FIG. 3B illustrates how real memory portions 304B, 304C, and 304E can be emptied by the hardware controller 112 (FIG. 1). Page-3 is moved from real memory portion 304B to real memory portion 304A. The memory controller may modify its cross-reference (often called a translation table) accordingly. Page-120 is similarly moved from real memory portion 304C to real memory portion 304A. Page-N-1 is moved from real memory portion 204E to real memory portion 304D. The solid arrows from virtual memory 302 to real memory 304 indicate the cross-reference after movement of pages; the dashed arrows indicate the cross-reference prior to movement of pages. The bold arrows within real memory 304 indicate the movement of pages.

Figure 3C:
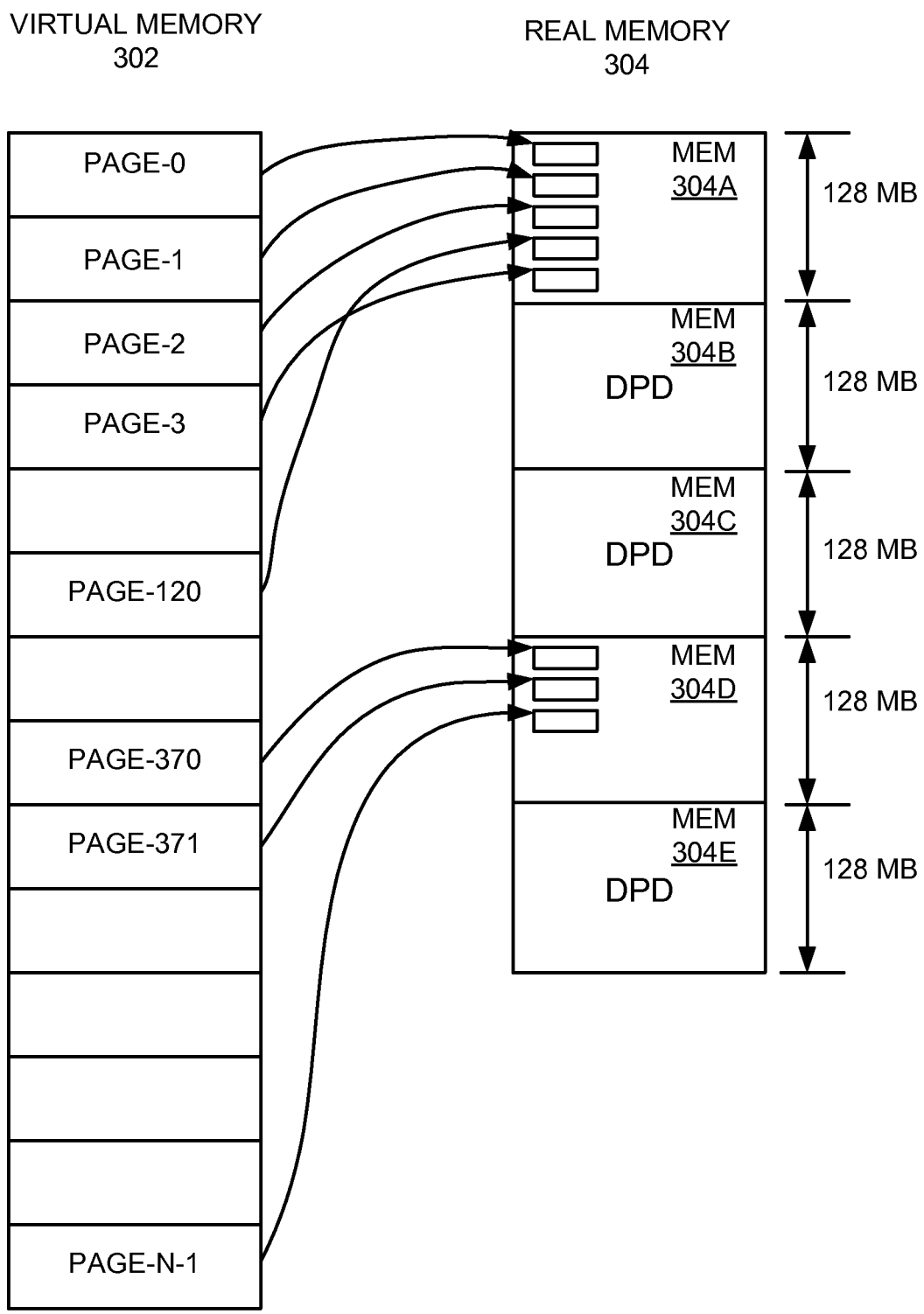
FIG. 3C depicts the allocation of pages in real memory portions after the movement illustrated in FIG. 3B, with empty real memory portions placed in reduced power down mode.

FIG. 3C illustrates allocated pages in real memory 302 following the moves described relative to FIG. 3B. Empty real memory portions 304B, 304C, and 304E contain no data needed by the computing system, and are placed in a reduced power mode, thereby reducing power consumption.

Figure 4:
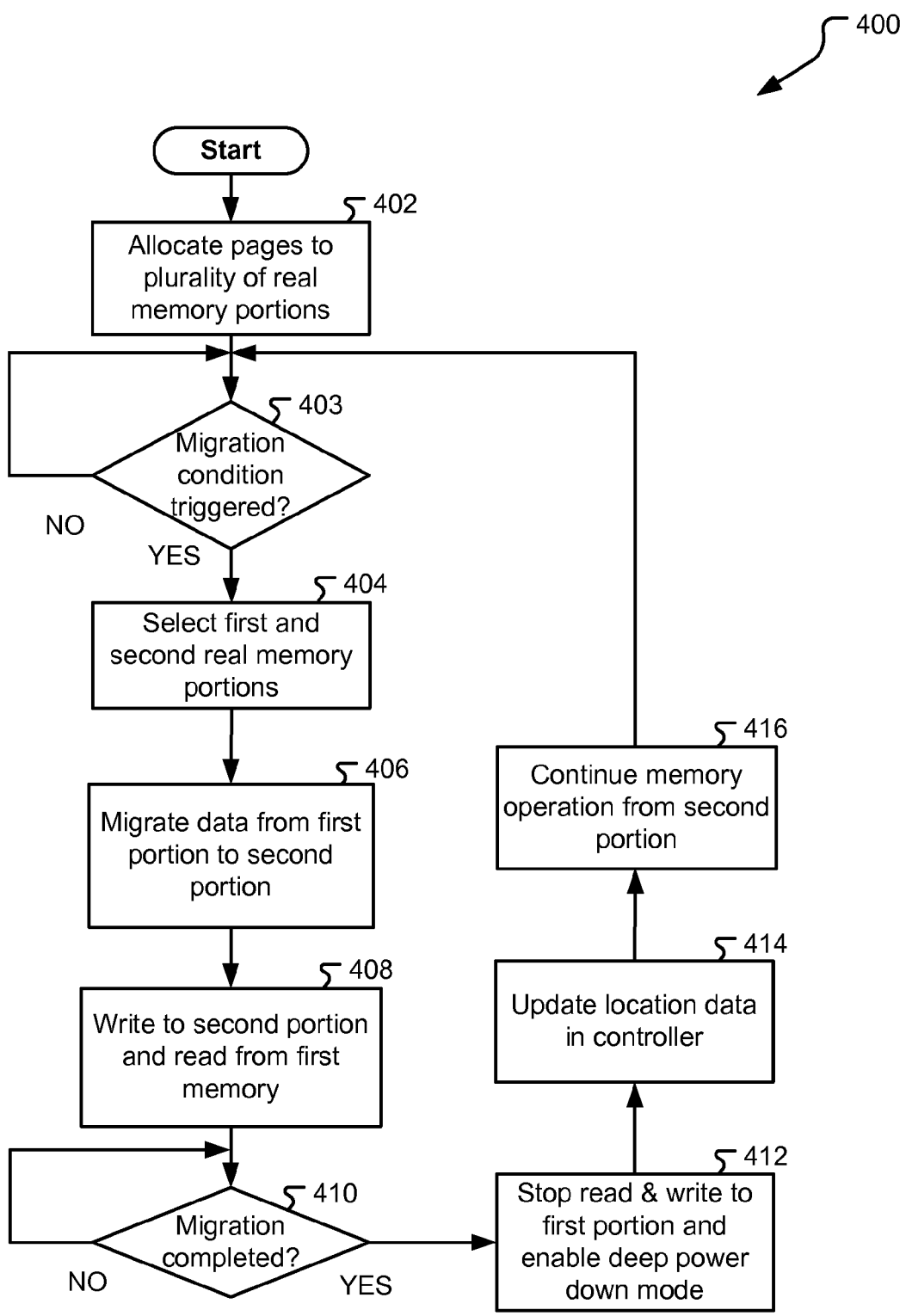
FIG. 4 depicts a flowchart of a method of memory power management according to an embodiment.

FIG. 4 shows a high level flowchart of a method 400 that implements an embodiment of the memory power management system. In operation 402, pages of virtual memory may be allocated to a plurality of real memory portions. Cross-references of the locations in real memory portions allocated to the pages of virtual memory may also be created and stored in a memory controller. However, different computing systems use various methods of cross-referencing virtual pages to the locations in real memory portions and other suitable methods of cross-referencing or locations for storing cross-referencing locations may be used. Once the pages of virtual memory are allocated, the method 400 may progress to operation 403.

In decision block 403, it is determined whether a migration trigger has occurred. Migration triggers may be conditions which determine whether a first real memory portion and a second real memory portion may have memory consolidated. If a migration trigger occurs, the method may progress to operation 406. The migration trigger may be selected as various conditions depending upon the preferences of a user. The migration triggers may be based on memory data such as capacity information, power consumption, and a value for a transfer threshold.

In an embodiment, the migration trigger may include determining that the first real memory stores data of a size less than an available capacity of the second real memory portion. In another embodiment, the migration trigger may include determining that a quantity value for the data in the first real memory portion is below a transfer threshold. A transfer threshold may be a number representing a quantity of pages allocated in a memory portion. The transfer threshold may designate which real memory portions may be used for memory consolidation. A real memory portion having a number of allocated pages greater than the transfer threshold may not be considered a candidate for having pages moved from that real memory portion. A transfer threshold value may be selected as any number, and may be selected according to the needs of a user of a computer system. For example, if a particular real memory portion can contain 32,000 pages, the designer (or administrator) may set, for example, a value of 100 as the transfer threshold. If more than 100 pages are allocated to the real memory portion, no effort will be made to empty that particular real memory portion. Similarly, if 100 or less pages are allocated to the particular real memory portion, the 100 or less pages can be moved to a different real memory portion to empty the particular real memory portion.

The migration trigger may also include including determining that the second real memory portion has an available capacity to receive the data from the first real memory portion. The migration trigger may include determining that a first power consumption value for the first real memory is greater than a second power consumption value for the second real memory portion. If the migration trigger does not occur, then the decision block 404 may reset the method 400 back to operation 403 and wait until a migration condition is triggered.

In operation 404, first and second real memory portions may be selected. In an embodiment, the memory controller may be configured to select a first real memory portion and a second real memory portion from a plurality of real memory portions. The first and second real memory portions may be selected for consolidation of data. The first and second real memory portions may be selected based on a migration trigger, described further below, which may determine which real memory portions are preferred for data consolidation. In an embodiment, A third real memory portion or more portions may also be selected by the memory controller for consolidation of data from the first real memory portion to at least the second and third real memory portions.

In operation 406, the data may be migrated from the first real memory portion to the second real memory portion. As described above the data may be migrated across the migration bus across the first and second buffers. Operation 406 may initiate the consolidation process. As a part of the migration, in operation 408, writes may be allowed to the second real memory portion and reads may be allowed from the first memory. The method 400 may consolidate pages from the first real memory portion to the second real memory portion. In an embodiment, the method 400 may consolidate pages from the first real memory portion to at least the second and third real memory portions. The data transfer may maintain the physical location of the page in the first memory during the process of consolidation and read requests to the page may be directed to the physical location in the first memory while the migration is in progress.

If the migration has been completed then, in decision block 410, the method may progress to 412. If the migration has not been completed, then decision block 410 may wait until it receives indication that the migration has been successfully completed. Once the migration has been completed and the page has been written to the second portion, in operation 412, write and read commands may be stopped to the first real memory portion and the first real memory portion may be placed in the reduced power mode. Placing the first real memory portion in the reduced power mode may clear the first memory and reduce the power consumption of the computer system.

After the consolidation of the page from the first real memory portion to the second real memory portion, in operation 414, a memory controller may be updated to have a physical address of the data from the first real memory portion to the second real memory portion. And, in operation 416, memory operations may be continued with the data's updated physical location in the second real memory portion. The method 400, may then reset back to operation 403 and the method 400 may wait to select first and second real memory portions which trigger a migration trigger in decision block 404.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for memory power management comprising:
   a plurality of real memory portions including a first real memory portion and a second real memory portion, wherein each of the plurality of real memory portions has a dedicated buffer and is a rank of memory located on a dual inline memory module (DIMM) that provides a physical location for data to be stored, including a first dedicated buffer connected to the first real memory portion and a second dedicated buffer connected to the second real memory portion, wherein each of the dedicated buffers is configured to verify channel connectivity, synchronize the DIMMs, and detect errors;
   a migration bus, the migration bus connecting each of the dedicated buffers;
   a data management controller, within at least one of the dedicated buffers, the data management controller configured to
      migrate data, from the first real memory portion to the second real memory portion across the migration bus through the first and second dedicated buffers, and
      place the first real memory portion into a reduced power mode; and
   a memory controller, wherein the plurality of real memory portions is coupled to the memory controller by a memory bus, wherein the memory controller is configured to select the first and second real memory portions, wherein the data management controller is configured to migrate data from the selected first real memory portion to the selected second real memory portion.

2. The system of claim 1, wherein the migration bus connects each of the dedicated buffers in a daisy chain.

3. The system of claim 1, wherein the plurality of real memory portions includes a third real memory portion connected to a third dedicated buffer, the data management controller configured to migrate data, from the first real memory portion to at least the second and third real memory portions across the migration bus through the first, second, and third dedicated buffers.

4. The system of claim 1, further comprising a hardware controller, the hardware controller including a physical address of the data, the data management controller further configured to update the physical address of the data from the first real memory portion to the second real memory portion.

5. The system of claim 4, wherein the hardware controller includes a hypervisor.

6. The system of claim 1, wherein the memory controller is further configured to
   select the first and second real memory portions in response to a migration trigger, the migration trigger including determining that the first real memory portion stores data having a data size less than an available capacity of the second real memory portion.

7. The system of claim 1, wherein the memory controller is further configured to
   select the first and second real memory portions based on a migration trigger, the migration trigger including determining that the data in the first real memory portion is below a transfer threshold.

8. The system of claim 1, wherein the memory controller is further configured to
   select the first and second real memory portions based on a migration trigger, the migration trigger including determining that the second real memory portion has an available capacity to receive the data from the first real memory portion.

9. The system of claim 1, wherein the memory controller is further configured to
   select the first and second real memory portions based on a migration trigger, the migration trigger including determining that a first power consumption value for the first real memory portion is greater than a second power consumption value for the second real memory portion.

* * * * *